Oct. 29, 1940.  A. O. FABRIN  2,219,519
RUBBER BEARING
Filed Aug. 28, 1939
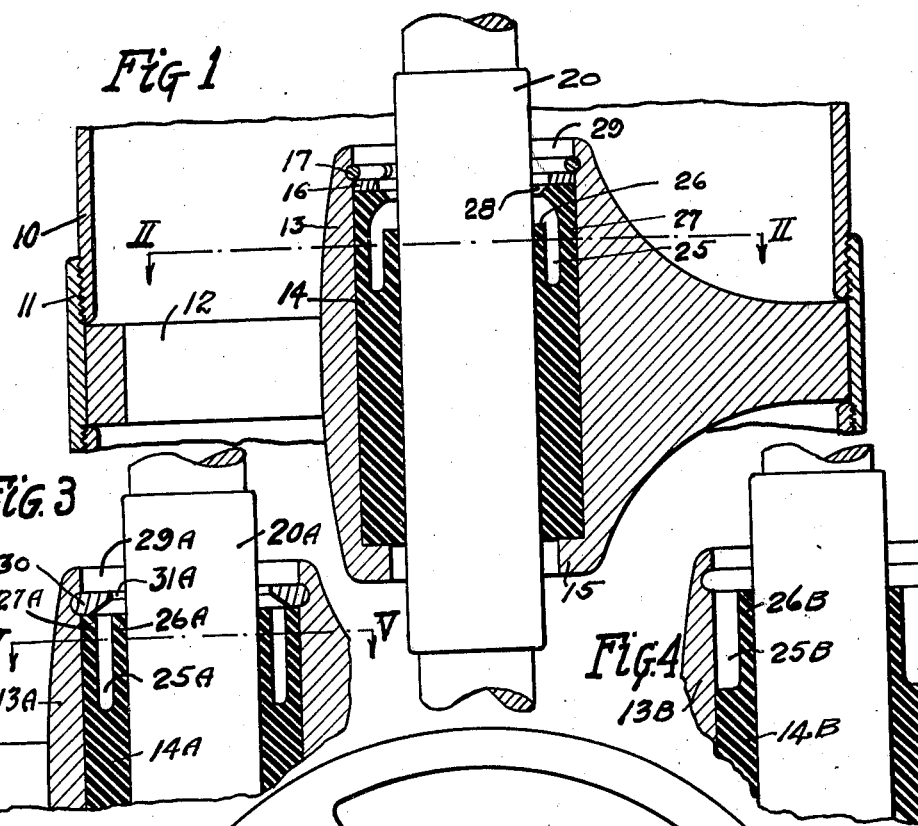
INVENTOR
AXEL O. FABRIN
by J.W. Weatherford
Atty.

Patented Oct. 29, 1940

2,219,519

UNITED STATES PATENT OFFICE 2,219,519

RUBBER BEARING

Axel O. Fabrin, Memphis, Tenn., assignor to Layne and Bowler, Incorporated, Memphis, Tenn., a corporation of Delaware Application August 28, 1939, Serial No. 292,282

4 Claims. (Cl. 308—240)

This invention relates to means for accomplishing the lubrication of soft rubber bearings, as they are initially put in use, or put in use after an inactive period.

The invention more particularly relates to improvements in shaft bearings of this type for deep well pumps, which bearings are lubricated during use by the water flowing upward through the pump column, but which bearings are usually not lubricated after shut-down periods until the pump has been running for a length of time necessary to fill the pump column.

Rubber bearings for deep well pumps, and particularly for the shafts which lead from a motor at the top of the well downward through the pump discharge pipe to the pump impeller have long been in use and during continuous pumping these bearings are efficiently lubricated by the water which is discharged by the pump upward through the pipe. When the pump however is shut down the water drops in the pipe leaving the greater number, if not all, of the shaft bearings substantially dry. Thereafter when the pump is started up these bearings must run dry until the pipe again fills, with imminent danger of causing serious damage to the rubber bearing.

A very efficient type of these bearings provide grooves in the rubber in adjacency to the surface of the shaft which permit ready access of the water, when available, to the bearings, but these grooves during shut-down periods form extremely active channels for draining off the water and substantially insure the very undesirable result that the bearings will be dry when the pump is again started.

Devices have been proposed, and put into use perhaps, which attempt to provide pockets which will hold a limited supply of water in the bearings and purportedly will supply the deficiency otherwise existing, but so far as is known the pockets in these devices are in communication with the surface of the shaft through small holes which are positioned well below the tops of the pockets and depend on contact between the bearing and the shaft for retaining the major portion of the supply of priming water, and this major portion of the water usually escapes downward along the shaft when the pump is shut down.

The pockets are closed at their upper ends so that it is substantially impossible to fill them to provide initial lubrication after installation and failure is invited, and often occurs, on the first starting after installation before the pump can function and deliver lubricating fluid.

Also these forms of devices in all cases utterly fail to lubricate the upper end of the bearings above the pockets, so that failure of the upper portion of the bearings occurs, such upper portion failure usually destroying adjacent lower portions, and such destruction progressing downward until the entire bearing is destroyed.

The object of the present invention is to provide in a rubber bearing, a pocket upwardly open, which has a side wall forming part of the shaft bearing surface, over the top of which wall any lubricant discharged from the pocket must flow, whereby the bearing is lubricated throughout its entire length, the wall of the pocket when dry, gripping the shaft momentarily at the initiation of turning movement of the shaft and spilling from the pocket sufficient lubricating fluid to provide lubrication and release the grip before damage can occur.

The means by which the foregoing and other objects are accomplished, and the method of their accomplishment will readily be understood from the following specification on reference to the accompanying drawing, in which:

Fig. 1 is a sectional elevation of a bearing for the shaft of a deep well pump taken on the line I—I of Fig. 2.

Fig. 2 is a corresponding sectional plan view taken as on the line II—II of Fig. 1.

Fig. 3 is a fragmentary sectional elevation showing a slight modification of the form of the upper end of the pocket and of the retaining ring for the rubber bearing.

Fig. 4 is an additional fragmentary section of a further modification of such upper portion; and Fig. 5 a sectional plan of a modified form of the sleeve taken as on the line V—V of Fig. 3.

Referring now to the drawing in which the various parts of the device are indicated by numerals:

10 are sections of a pump casing coupled together by a sleeve 11; and 12 is a spider disposed in the coupling between two casing sections. The spider carries an annular hub 13 in which a rubber bearing sleeve 14 is solidly supported and held from turning. Preferably the hub has an inwardly extending annular flange 15 on which the lower end of the sleeve rests. 16 is an annular ring resting on the upper end of the sleeve and held in place by an usual type of split ring 17, which latter ring engages a complementary groove adjacent the upper edge of the hub.

In cross section the sleeve 14 is of an exterior shape conforming to the interior shape of the hub 13 and in addition to the shoulder and retaining ring may be additionally held by cementing or vulcanizing in well known manner thereto.

The bore of the sleeve which contacts and forms a bearing for the surface of the shaft 20 and journals such shaft may be truly cylindrical and closely fit the entire periphery of the shaft, or it may be provided with a plurality of contacting surfaces 21 which swing away from the shaft at their meeting edges and form grooves 22 extending throughout the depth of the sleeve, these grooves usually extending parallel to the axis of the shaft, though not necessarily so.

At its upper end the sleeve is annularly chambered to form an open top annular pocket 25, this pocket having an annular inner wall 26 which surrounds the shaft, the bore of this wall and if continuing to form the bore of the sleeve such sleeve bore be formed with the contacting surfaces 21 and grooves 22, the bore of the wall being similarly formed. The outer wall 27 of the pocket is also annular, its outer surface forming preferably a continuation of the outer surface of the bearing. This annular outer wall may extend above the annular inner wall and may have its inner surface, or bore, inwardly turned to over-lie the pocket 25 and form a partial top therefor. Preferably, however, such inward extension does not continue to a contact with the shaft so that there is an annular opening 28 along the shaft through which access from above may be had to the open top of the pocket. Above the bearings, the rings 16, 17, and the hub 13 are annularly spaced from the shaft so that an annular entrance 29 of relatively generous extent is provided for the introduction from above of the lubricant.

In Fig. 3, 13A is the hub, 14A the bearing sleeve, 25A the annular pocket in the sleeve, and 26A the inner wall of the sleeve, these being substantially identical with those just above described. In this form of the device, however, the outer wall 27A of the sleeve is of substantially the same height as the inner wall and is held down by a one-piece retaining ring 30 which is of the split ring type to permit insertion. The inner portion of this ring overlies the pocket 25A, being undercut however to permit a free opening into the pocket from above. The ring 30 is annularly spaced from the shaft so that an annular opening 31A is provided along the shaft into the pocket of the sleeve and the hub is annularly open at 29A above this ring.

In Fig. 4, 25B is a pocket in the upper end of the sleeve, the inner wall 26B of this pocket being substantially identical with the inner walls 26 and 26A. The outer wall of the pocket in the sleeve, however, has been cut away and this outer wall is formed by the bore of the hub 13B. In this form of the device it is essential that the sleeve 14B be so secured to the bore of the hub 13B that there be no chance of displacement of the sleeve with reference to the hub and so secured that a water-tight seal is formed between the sleeve and the hub, this preferably being done by cementing or vulcanizing the sleeve to the bore of the hub.

In the above description the pocket has been described as annular and it is preferably so made. It will be understood however, that, as shown in Fig. 5, the pocket may be divided, as by radial ribs 35, into two or more pockets, four being shown.

In using the device the shaft and bearings are installed in any usual or desired manner. After completion of the installation, water is slowly poured in a very small stream against the shaft adjacent its upper end. A very large proportion of this water will follow along the shaft until it reaches the first bearing where a portion will be diverted to fill the pocket; a portion will flow through the grooves 22 in the bearing, and an additional portion will flow around the outside of the bearing and again follow in and along the shaft to the next bearing, this continuing until the pockets in all the bearings have been filled.

After priming, the pump may be immediately started. If this is done there may be sufficient lubrication to carry on. Ordinarily, however, there is sufficient lapse of time for the bearing to dry out, though not for the supply of water in the pockets to be appreciably diminished. Under such conditions the rubber of the bearing tends to grip the shaft. The free upper portion of the thin annular wall of the pocket is readily distorted as turning of the shaft starts and tends momentarily to draw downward, not only lowering the top of the wall and allowing the water to run over, but crowding outward into, and reducing the volume of, the pocket, forcing the water therefrom over the inner wall edge so that the lubricant is immediately available to lubricate the bearing and concurrently free the pocket wall, the same action taking place throughout all the bearings from top to bottom of the system and gives sufficient lubrication to last until action of the pump shall have forced water upward and taken over that function. As soon as lubrication is effected the pocket wall is freed and the pocket resumes its normal shape and volume and is recharged by pump discharge flow, so that the bearings are thereafter at all times ready to function without manual priming, or other attention, and to furnish lubrication on restarting of the pump after shut-downs.

I claim:

1. A bearing of the water lubricated type for use in an inaccessible position on a discharge-pipe-enclosed, vertical pump-shaft, said bearing including a soft rubber sleeve having a relatively minor portion of its upper end annularly chambered to provide a water receiving pocket, and a major body portion extending without substantial interruption therebelow, said pocket being directly open from above for filling purposes and adapted to intercept a priming charge of lubricating fluid from fluid deposited in said discharge pipe above said bearing.

2. A bearing of the water-lubricated type for use in an inaccessible position on a discharge-pipe-enclosed, vertical pump-shaft, said bearing including a soft rubber sleeve having an open topped annular end recess of minor depth relatively to the depth of said sleeve, said recess being adapted to receive fluid deposited in said discharge pipe above said bearing for initial lubrication of said bearing, the major body portion of said sleeve extending below said recess without substantial interruption.

3. A bearing of the water lubricated type for use in inaccessible position on a discharge-pipe-enclosed, vertical, pump-shaft, said bearing including a soft rubber sleeve having its upper end grooved to provide an annular pocket substantially concentric with the bore of said sleeve and of minor depth relatively to the depth of said sleeve, said pocket being open at the top and adapted to retain a priming charge of lubricating fluid deposited from thereabove, and having an annular inner wall, inherently of greatly reduced thickness as compared to said sleeve thickness, contacting the exterior of said shaft, said wall under gripping action of said shaft induced by lack of lubrication, being distortable by initial rotational movement of said shaft, to discharge lubricant from said pocket inward over said wall and provide initial bearing lubrication, and release of said gripping action.

4. A bearing of the water-lubricated type for use in inaccessible position on a casing enclosed, vertical, pump-shaft, said bearing includig a chambered, discharge-pipe-carried hub, and an annular soft rubber sleeve disposed in said hub chamber, and held therein against longitudinal and rotational displacement, said chamber continuing above said sleeve and being fully open at its upper end; and adapted to intercept a priming charge from fluid deposited in said casing above said bearing, said sleeve having at its upper end a relatively minor pocket adapted to receive and retain a priming charge of lubricating fluid from said hub chamber, said pocket being open at the top for ingress of fluid from said hub chamber and separated by a relatively thin annular wall portion of said sleeve from said shaft, the inner surface of said wall forming a continuation of the bearing surface of said sleeve, said wall being adapted, under gripping action with said shaft induced by lack of lubrication and under initial turning movement of said shaft, to be momentarily distorted and thereby to discharge from said pocket over the upper edge of said wall, lubricating fluid held in said pocket to accomplish initial lubrication of said bearing and release of said annular wall portion from such gripping action.

AXEL O. FABRIN.